B. M. HOTCHKISS.
DRESS SHIELD.
No. 108,908.        Patented Nov. 1, 1870.
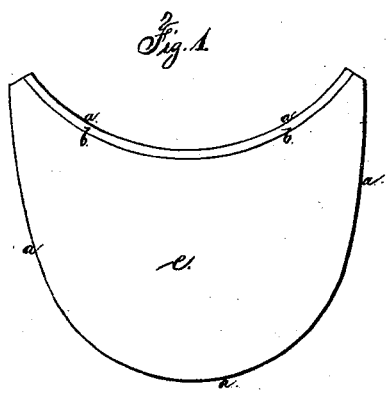
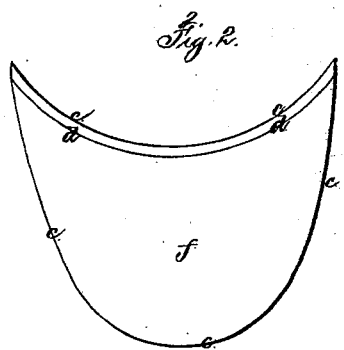
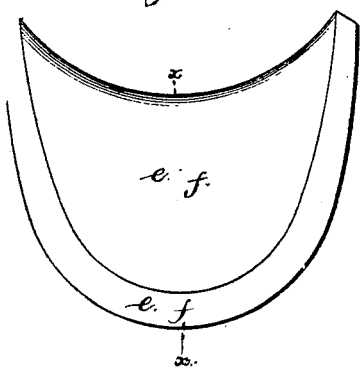
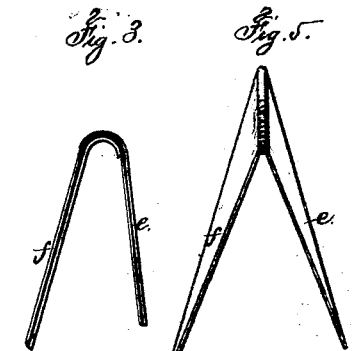
Witnesses,
Chas H Smith
Geo T Pinckney
Inventor:
Burritt M Hotchkiss
Lemuel W Serrell
Atty.

United States Patent Office.

BURRITT M. HOTCHKISS, OF NAUGATUCK, CONNECTICUT, ASSIGNOR TO THE GOOD-YEAR INDIA-RUBBER GLOVE MANUFACTURING COMPANY, OF SAME PLACE.

Letters Patent No. 108,908, dated November 1, 1870.

IMPROVEMENT IN DRESS-SHIELDS.

The Schedule referred to in these Letters Patent and making part of the same.

*To all whom it may concern:*

Be it known that I, BURRITT M. HOTCHKISS, of Naugatuck, in the county of New Haven and State of Connecticut, have invented and made a new and useful Improvement in Dress-Shields; and the following is declared to be a correct description thereof.

Shields have heretofore been made of India rubber, to be inserted within the dress and beneath the arms, to prevent perspiration passing into the fabric of the dress and injuring the same. These shields have been made of two pieces of India-rubber cloth, cut in a crescent shape, and sewed together at the edge, or else the concave edges have been folded and cemented, one upon the other, by India-rubber cement.

In the first-named instance the perspiration penetrates the needle-holes; in the second-named instance there is a heavy seam in the edge of the shield next the person, the cement is liable to separate from the cloth, and the fibers of the cloth pass through between the two thicknesses of the seam, and, practically, it is found that perspiration passes, by capillary attraction, along the fibers of the cloth from one side to the other, and thus through the seam or double thickness.

My invention is made for rendering the seam thinner and more pliable, and for bringing the rubber surfaces together at the seam, so that they will adhere without the use of cement, and be much stronger, and not so wide, and, at the same time, the fibers of the cloth do not extend through the seam or join.

I take India-rubber cloth with a thin coating of gum caoutchouc on one side, and cut the same out, of the desired crescent shape, by dies or otherwise.

Let the outline $a$ represent this shape.

I cut out other pieces of cloth of the same shape, except that on the concave edge they only extend to the line $b$, fig. 1, so that, when the two pieces of cloth are put together so as to adhere, there will be a surface of India-rubber exposed between the lines $a\ b$.

This piece of the shield may be made by either plain muslin or cloth, pressed upon the rubber so as to cover up the surface, except between $a\ b$; or the applied piece may be a second piece of rubber cloth, the surfaces of rubber being brought together.

Several thicknesses of the respective pieces of material can be cut out together by stamps or dies and separated, and then the proper pieces laid together; or the smaller pieces can be laid upon a sheet of rubber cloth and the cloth subsequently cut out to the shape $a$ by dies or otherwise.

A second piece, forming the other half of the shield, is made in a similar manner to the foregoing, and is shown in fig. 2, the rubber surface being left exposed between the lines $c\ d$.

The pieces of the shield may be cut out by dies from two thicknesses of material laid together, and then one of the fabrics cut through at the line $b$ or $d$, and the strip of cloth pulled off so as to expose the rubber surfaces between $a\ b$ and $c\ d$, and then the halves are to be united, as next described.

These two halves, $e\ f$, made as aforesaid, are to be united together by bringing the rubber surfaces between $a\ b$ and $c\ d$ in contact, in the manner illustrated in fig. 3, where the fabric is shown of undue thickness, so as to be more distinct.

The surfaces are laid together flatwise, and hence have to be manipulated by hand in bringing the rubber edges properly together. I prefer to make use of a concave-edged mold, over which to place the shield when joined, and a convex weight, slightly warmed, is employed to press the rubber surfaces together and insure their adhering, and by the heat to partially cure the India rubber, thus rendering the joint or seam of the most durable character, and the shield is free from the objections before enumerated.

Figure 4 represents an elevation of the shield, complete; and

Figure 5 is a vertical section of the same, at the line $x\ x$, fig. 4.

I claim as my invention—

The India-rubber shield, made with a seam of the character and in the manner specified.

Dated this 19th day of August, A. D. 1870.

B. M. HOTCHKISS.

Witnesses:
GEO. T. PINCKNEY,
CHAS. H. SMITH.